United States Patent
Kawakami et al.

(10) Patent No.: US 7,481,958 B2
(45) Date of Patent: Jan. 27, 2009

(54) PROCESS AND APPARATUS FOR FORMING A PLASTIC SHEET HAVING RECESSED AND PROTRUDED PARTS AND DOUBLE WALL SHEET HAVING THE PLASTIC SHEET

(75) Inventors: Hajime Kawakami, Nagoya (JP); Osamu Sugiyama, Nagoya (JP); Masamoto Iwasaka, Nagoya (JP)

(73) Assignee: Kawakami Sangyo Co., Ltd., Aichi (JP)

( * ) Notice: Subject to any disclaimer, the term of this patent is extended or adjusted under 35 U.S.C. 154(b) by 534 days.

(21) Appl. No.: 10/525,945

(22) PCT Filed: Aug. 1, 2003

(86) PCT No.: PCT/JP03/09828
§ 371 (c)(1),
(2), (4) Date: Feb. 28, 2005

(87) PCT Pub. No.: WO2004/022313
PCT Pub. Date: Mar. 18, 2004

(65) Prior Publication Data
US 2005/0249920 A1    Nov. 10, 2005

(30) Foreign Application Priority Data
Aug. 29, 2002   (JP) .............................. 2002-250146

(51) Int. Cl.
*B28B 1/14*    (2006.01)
*B29C 41/00*   (2006.01)
*B29C 59/04*   (2006.01)

(52) U.S. Cl. .................. 264/299; 264/241; 425/194; 425/328; 425/363; 156/285

(58) Field of Classification Search ................. 428/174, 428/178; 52/789.1; 156/209, 285, 290; 264/175, 264/177.13, 177.17, 241, 299; 425/194, 425/363, 364, 370, 364 R, 328
See application file for complete search history.

(56) References Cited

U.S. PATENT DOCUMENTS 3,527,664 A * 9/1970 Hale .......................... 428/179
3,661,613 A * 5/1972 Contrael et al. ............. 428/187

(Continued)

FOREIGN PATENT DOCUMENTS

JP          52-44357 B2     11/1977

(Continued)

*Primary Examiner*—Donald Loney
(74) *Attorney, Agent, or Firm*—Posz Law Group, PLC

(57) ABSTRACT

A plastic sheet having a number of recessed and protruded parts useful as a protective sheet in moving and construction, and for cushion packaging and thermal insulation is disclosed. Also disclosed is a two-layered or three-layered double wall sheet, which is produced by adhering one or two flat plastic sheets on the above plastic sheet. The double wall sheet has high rigidity against bending and improved warps when compared with the conventional plastic bubble boards, and is useful as the material for various panels and packaging containers. The plastic sheet is produced by vacuum forming to form plural protruded, truncated cone-shaped parts and recessed, ring-shaped parts surrounding and continuing from the protruding parts. The double wall sheet is produced by adhering a back sheet and/or liner sheet to the plastic sheet.

7 Claims, 7 Drawing Sheets

U.S. PATENT DOCUMENTS 5,217,788 A  6/1993  Rye

FOREIGN PATENT DOCUMENTS

| JP | 58-108113 A | 6/1983 |
| JP | 9-142569 A | 6/1997 |
| JP | 54-143483 A | 11/1997 |
| JP | 10-138377 A | 5/1998 |
| JP | 11-216060 A | 8/1999 |
| JP | 2003-127215 A | 5/2003 |

* cited by examiner

PROCESS AND APPARATUS FOR FORMING A PLASTIC SHEET HAVING RECESSED AND PROTRUDED PARTS AND DOUBLE WALL SHEET HAVING THE PLASTIC SHEET

BACKGROUND OF THE INVENTION

The present invention concerns a plastic sheet having a number of recessed and protruded parts prepared by forming recessed parts and protruded parts on a flat sheet. The invention also concerns a two-layered or three-layered double wall sheet prepared by combining the above plastic sheet with another flat plastic sheet or sheets. The invention further concerns a method of producing the above-mentioned plastic sheet having a number of recessed and protruded parts, a method of producing the above-mentioned double wall sheet, and an apparatus for producing them.

There has been known processed article of thermoplastic material called "plastic bubble sheet", which is produced with a thermoplastic material such as polyethylene and polypropylene by thermal processing (usually, vacuum forming) to form a cap-film having a number of cap-shaped projections and by adhering a flat back film to the base surface of the cap film or adhering a flat liner film to the tops of the caps, or adhering both the back film and the liner film. The product is widely used as the material for cushion-packaging, thermal insulators, or a protective sheet at moving and construction.

There are variations of the plastic bubble sheets in which thicker films, which may be more appropriately called sheets, are used as the constituting material. The products are called "plastic bubble boards" and are also widely used as the building materials, concrete placing panels, protecting boards, or materials for various containers.

The difference between the plastic bubble sheet and the plastic bubble board resides in the difference of thickness of the films or sheets as the components, and the difference of thickness of the product plastic bubble sheet and the plastic bubble board, on which the strength and the rigidity of the products depend, and therefore, the two kinds of products are applied to the appropriate use. In the following description the material films and sheets are represented by a "sheet", and the product bubble sheets and bubble boards, by a "bubble board".

The above described bubble board have two grades: the two-layered bubble board prepared by adhering a back sheet to the base of the cap sheet or by adhering a liner sheet to the tops of the caps, and the three-layered bubble board prepared by adhering both the back sheet and the liner sheet. Of the two-layered ones, those having a back sheet have lower rigidity, and therefore, are applied to the use where no bending rigidity is required. Even though the two-layered ones having a liner sheet can be applied to the use where the bending rigidity is required, it is a drawback that the products are not suitable as the protecting sheet, because those who stepped on the sheet may miss their footing. The three-layered ones have the highest bending rigidity and both the surfaces are smooth, and therefore, are suitable for applying to the use where such the features are required and where slipping is out of the question. The weak point of the three-layered bubble boards is, due to the producing process, that warps tend to occur during producing.

SUMMARY OF THE INVENTION

The first object of the present invention is to provide a plastic sheet having a number of recessed and protruded parts with some cushioning ability to the stress in the direction vertical to the face of the sheet, and when used as the protecting sheet, exhibiting good non-slip property.

The second object of the present invention is to provide a two-layered or three-layered double wall sheet having the above plastic sheet as the component, to which one or two flat plastic sheet are adhered, and exhibiting higher bending rigidity and improved warp when compared with the conventional plastic bubble boards.

The object of the invention includes providing a method of producing the plastic sheet having a number of recessed and protruded parts, a method of producing the double wall sheet having the above plastic sheet as the component, as well as an apparatus for carrying out the methods of producing.

DETAILED DESCRIPTION OF THE PREFERRED EMBODIMENTS

Figure 1:
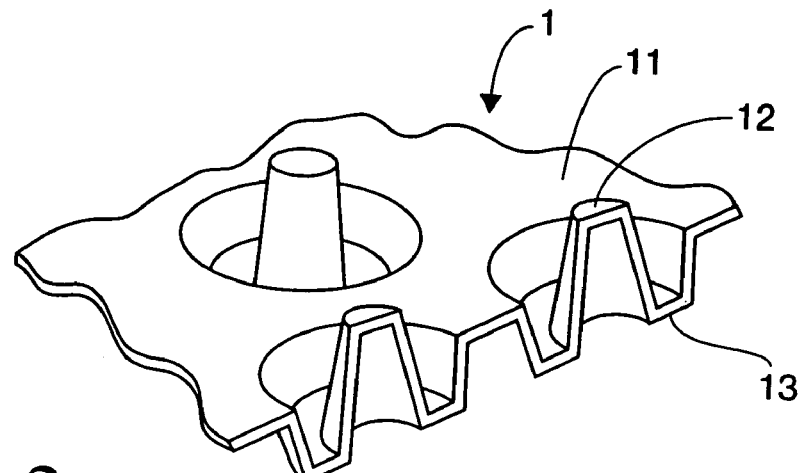
FIG. 1 is a perspective view illustrating an embodiment of a plastic sheet having a number of recessed and protruded parts according to the invention.

The plastic sheet according to the present invention is, as shown in FIG. 1, a plastic sheet (1) having a number of recessed and protruded parts produced by thermal processing to form a number of uneven parts consisting of a protruding, truncated cone-shaped part (12) and a recessed, ring-shaped part (13) surrounding and continuing from the protruding part on a plane (11) of a flat plastic sheet.

The plastic sheet having a number of recessed and protruded parts according to the invention includes various embodiments. In the embodiment shown in FIG. 1, the height (H) of the protruding, truncated cone-shaped part (12) from the bottom of the cone is larger than the depth (D) of the recessed, ring-shaped part (13), or H>D, which is the typical embodiment.

Figure 2:
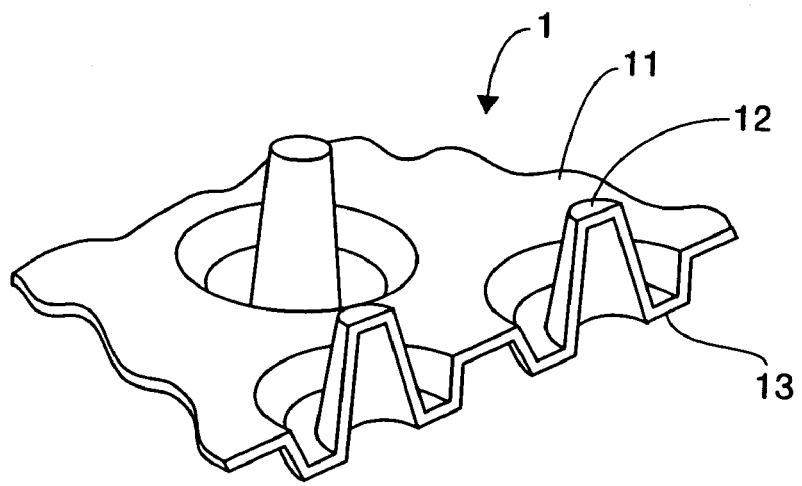
FIG. 2 is a perspective view, like FIG. 1, illustrating another embodiment of a plastic sheet having a number of recessed and protruded parts according to the invention.
Figure 3:
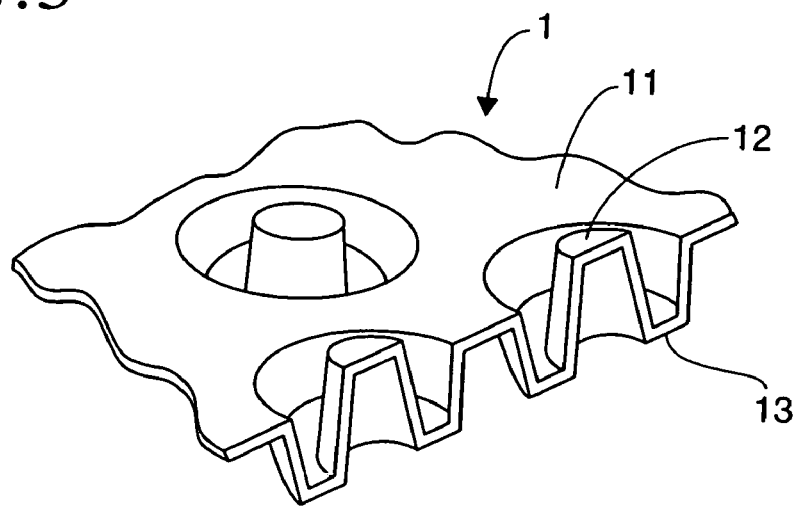
FIG. 3 is a perspective view, like FIG. 1, illustrating a further embodiment of a plastic sheet having a number of recessed and protruded parts according to the invention.

This embodiment includes the following three types:
a) H>2D The embodiment in which the height (H) of projection of the truncated cone-shaped part from the plane is larger than the depth (D) of the recessed, ring-shaped parts. This is shown in FIG. 2.
b) H=2D The embodiment in which the height (H) of projection of the truncated cone-shaped part from the plane is the same as the depth (D) of the recessed, ring-shaped parts. This is shown in FIG. 1.
c) H<D<2H The embodiment in which the height (H) of projection of the truncated cone-shaped part from the plane is smaller than the depth (D) of the recessed, ring-shaped parts. This is shown in FIG. 3.

Figure 4:
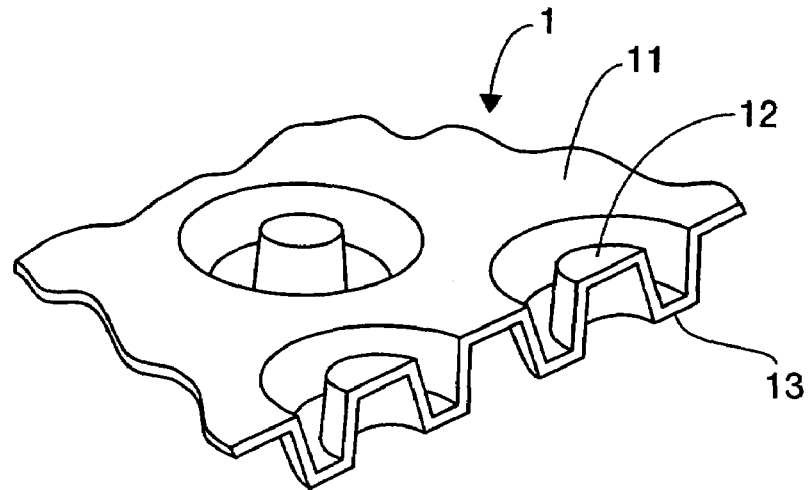
FIG. 4 is a perspective view, like FIG. 1, illustrating a still other embodiment of a plastic sheet having a number of recessed and protruded parts according to the invention.
Figure 5:
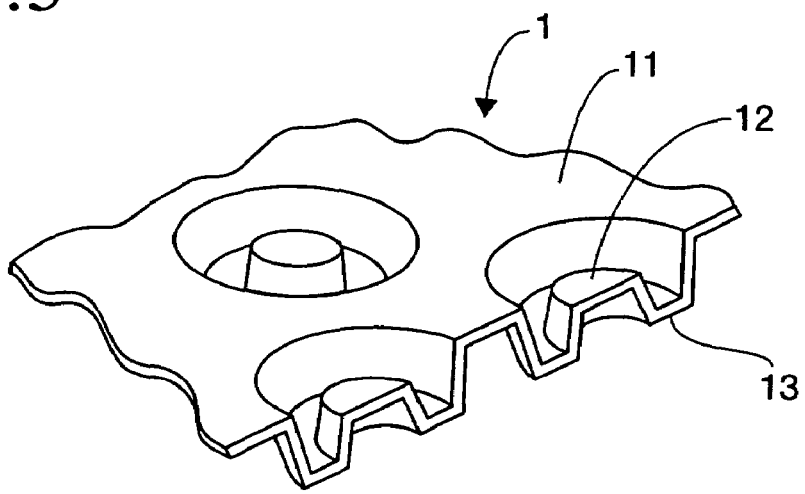
FIG. 5 is a perspective view, like FIG. 1, illustrating a still further embodiment of a plastic sheet having a number of recessed and protruded parts according to the invention.

Further embodiments as follows are possible.
d) H=D The embodiment in which the height (H) of projection of the truncated cone-shaped part based on the bottom of the recessed, ring-shaped part is nearly the same as the depth (D) of the recessed, ring-shaped parts. This is shown in FIG. 4.
e) H<D The embodiment in which the height (H) of projection of the truncated cone-shaped part based on the bottom of the recessed, ring-shaped part is smaller than the depth (D) of the recessed ring-shaped parts. This is shown in FIG. 5.

The two-layered double wall sheet according to the present invention also includes various embodiments. One of them is the two-layered double wall sheet (2A) shown in FIG. 6, which uses the plastic sheet (1) having a number of recessed and protruded parts, wherein H>D, as the component and a liner sheet is adhered to the tops of the protruded, cone-shaped part (12).

Figure 7:
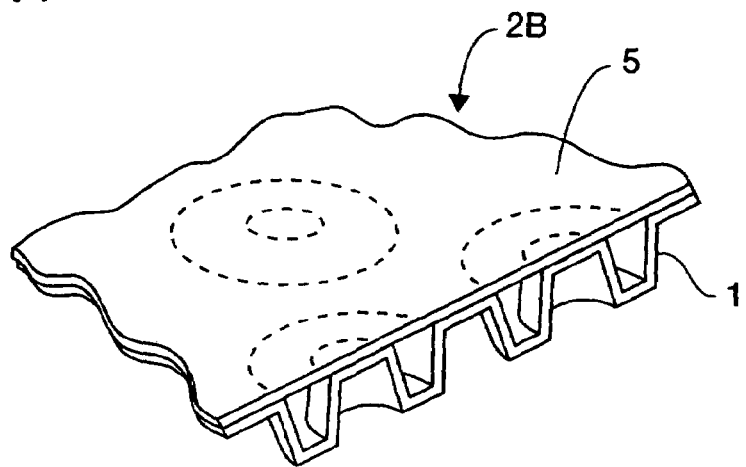
FIG. 7 is a perspective view, like FIG. 6, illustrating another embodiment of a two-layered double wall sheet of the invention.

Another one is the two-layered double wall sheet (2B) shown in FIG. 7, which uses the plastic sheet (1) having a number of recessed and protruded parts, wherein H=D, as the component, and a liner sheet (5) is adhered to the tops of the protruded, cone-shaped parts (12) and the plane (11). In case where the component plastic sheet is such one as H=D, then the product double wall sheet (not illustrated) will have the flat liner sheet only on the plane (11).

Figure 8:
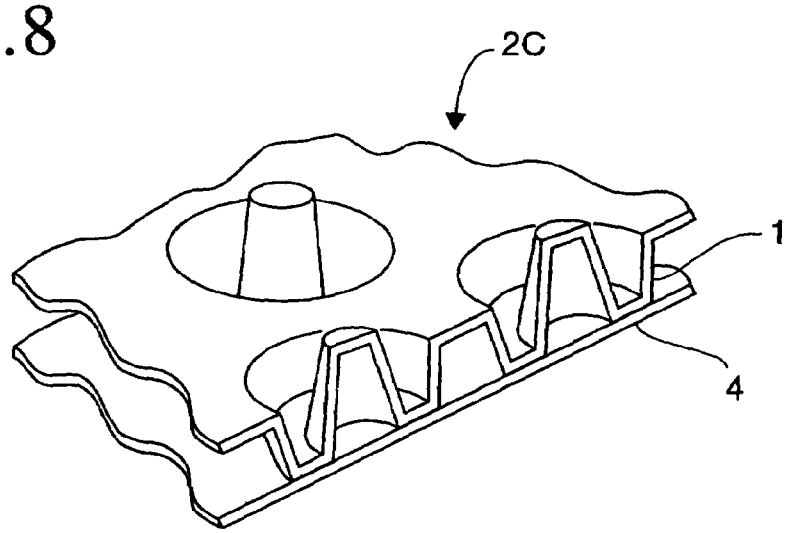
FIG. 8 is a perspective view, like FIG. 6, illustrating still other embodiment of a two-layered double wall sheet of the invention.

A further one is the two-layered double wall sheet (2C) shown in FIG. 8, which uses the plastic sheet (1) having a number of recessed and protruded parts as the component, and a flat back sheet (4) is adhered to the bottoms of the recessed, ring-shaped parts (13).

Figure 9:
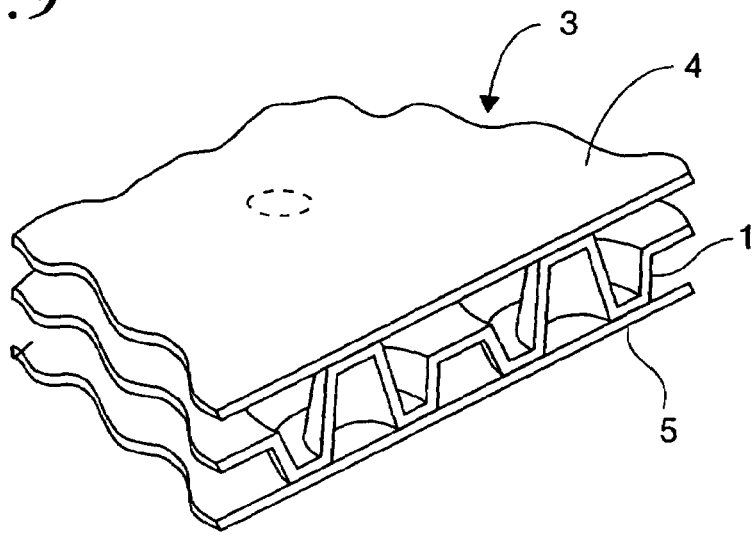
FIG. 9 is a perspective view illustrating an embodiment of a three-layered double wall sheet of the invention.
Figure 10:
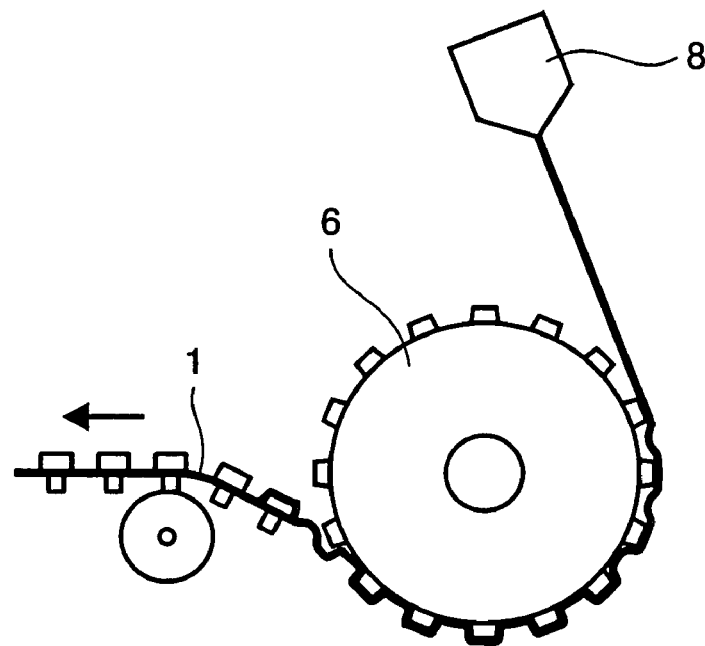
FIG. 10 is a conceptional side elevation view illustrating essential parts of an apparatus for producing the plastic sheet having a number of recessed and protruded parts according to the invention.

The three-layered double wall sheet (3) of the invention is produced by adhering a flat liner sheet (5) or flat back sheet (4) to any one of the above-described double wall sheets (2A, 2B or 2C) on the side opposite to the side on which a back sheet or a liner sheet is already adhered. This product may be understood either as such one that a flat back sheet (4) is adhered to the above-described two-layered double wall sheet (2A or 2B) having a liner sheet (5), or such one that a flat liner sheet (5) is adhered to the above-describe two-layered double wall sheet (2C) having a back sheet (4). FIG. 9 shows an embodiment of this product.

For the purpose of meeting elevated demand for the bending rigidity and the plane compressive strength, even in the conventional bubble boards, there has been such a product as "double ply-type", which uses a pair of cap sheets and flat sheets are disposed between the two cap sheets and on both the front and the back sides. In the double wall sheet according to the invention the plane part of the plastic sheet having a number of recessed and protruded parts takes the roll of the flat sheet between the two cap sheets of the conventional products, and thus, even the two-layered structure exhibits performance equal to that of the three-layered product. It can be easily understood that the three-layered product of the double wall sheet of the invention has performance exceeding that of the conventional double ply-type bubble board.

The method of producing the plastic sheet according to the invention as shown in FIG. 1 comprises the steps of: feeding a plastic sheet in the molten state extruded from a T-die (8) to a vacuum forming roll (6), which rotates around the axis at the center, and has plural projections and ring-shaped recesses each surrounding the projections and vacuum suction passages therein; forming plural protruding, truncated cone-shaped parts and recessed, ring-shaped part surrounding and continuing from the protruding part to have the parts evenly distributed on a plane of the plastic sheet, and pealing the formed plastic sheet from the vacuum forming roll.

Figure 6:
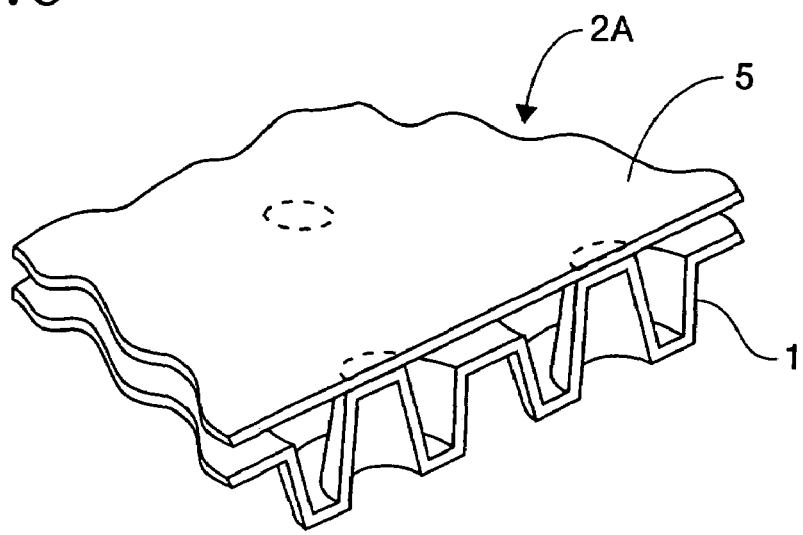
FIG. 6 is a perspective view illustrating an embodiment of a two-layered double wall sheet of the invention.
Figure 11:
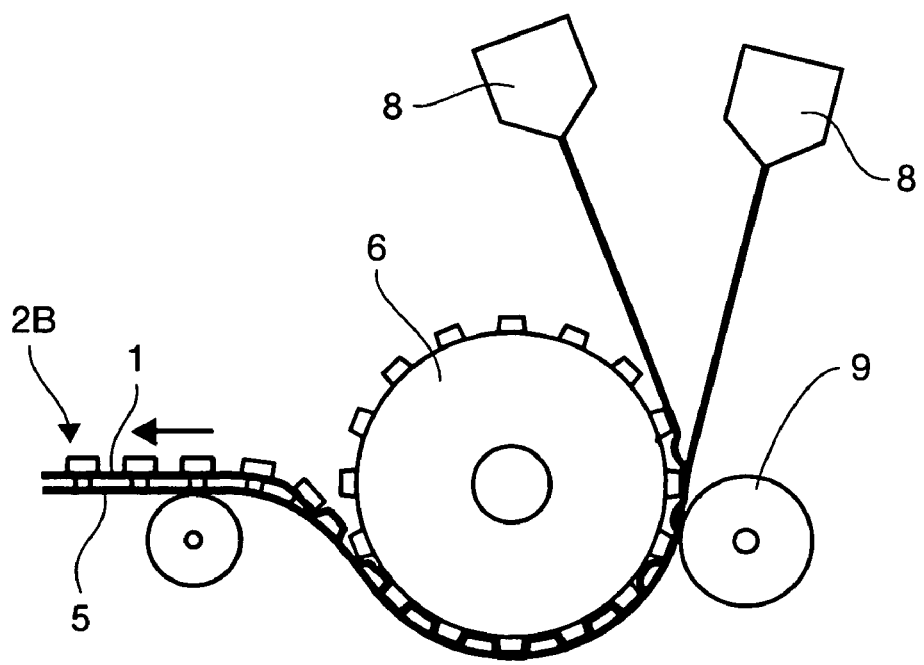
FIG. 11 is a conceptional side elevation view illustrating essential parts of an apparatus to explain a method of producing the two-layered double wall sheet of the embodiments of the invention as shown in FIGS. 1 to 6.

A method of producing the two-layered double wall sheet (2A, 2B and 2C) as shown in FIGS. 6 to 8 comprises, further to the above-described steps, as FIG. 11 illustrates the essential parts of the apparatus for producing, the steps of: feeding another flat plastic sheet in the molten state extruded from another T-die to the tops of the plural truncated cone-shaped parts or to the flat surface of the sheet so as to adhere by fusion to give the liner sheet (5), or to the bottoms of the recessed, ring-shaped parts so as to have the flat sheet adhered by fusion to give the back sheet (4) to the plastic sheet. In FIG. 11, numerical reference "9" shows a pressing roll for adhering the liner sheet to the plastic sheet.

Figure 12:
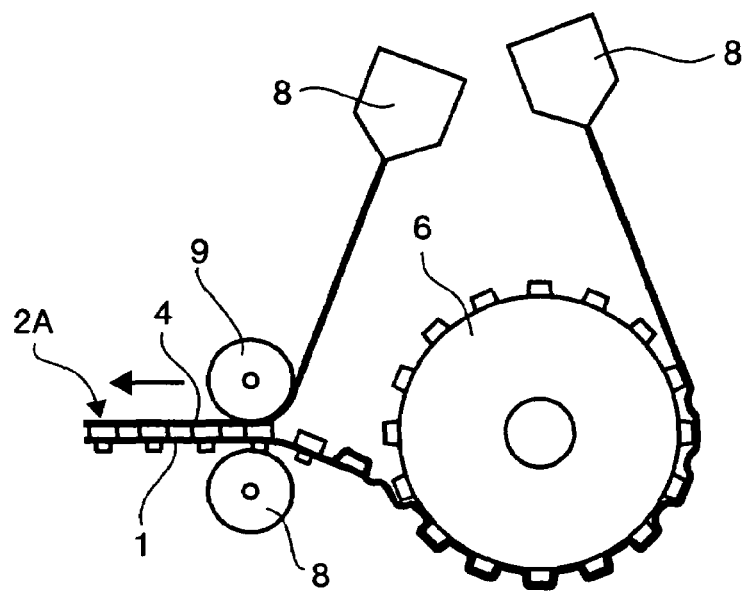
FIG. 12 is a conceptional side elevation view illustrating essential parts of an apparatus to explain another method of producing the two-layered double wall sheet of the embodiments of the invention as shown in FIGS. 1 to 6.

Another method of producing the two-layered double wall sheet (2A, 2B and 2C) as shown in FIGS. 6 to 8 comprises, following to the above-described steps for producing the plastic sheet having a number of recessed and protruded parts, as FIG. 12 illustrates the essential parts of the apparatus for producing, the steps of: feeding another flat plastic sheet in the molten state extruded from another T-die (8) to the bottoms of the plural recessed, ring-shaped parts of the plastic sheet, which was pealed out from the vacuum forming roll so as to adhere by fusion to give the back sheet (4), or to the tops of the plural truncated cone-shaped parts so as to have the flat sheet adhered by fusion to give the liner sheet (5). Also in FIG. 12, numerical reference "9" shows a pressing roll for adhering the back sheet.

The method of producing the three-layered double wall sheet (3) of the invention illustrated in FIG. 9 comprises, as may be understood from the above explanation, carrying out both the above-described additional and supplemental steps. In other words, the liner sheet or the back sheet is given to the plastic sheet having a number of recessed and protruded parts during producing the plastic sheet, and then, the remaining back sheet or the remaining liner sheet is given to the plastic sheet.

Figure 13:
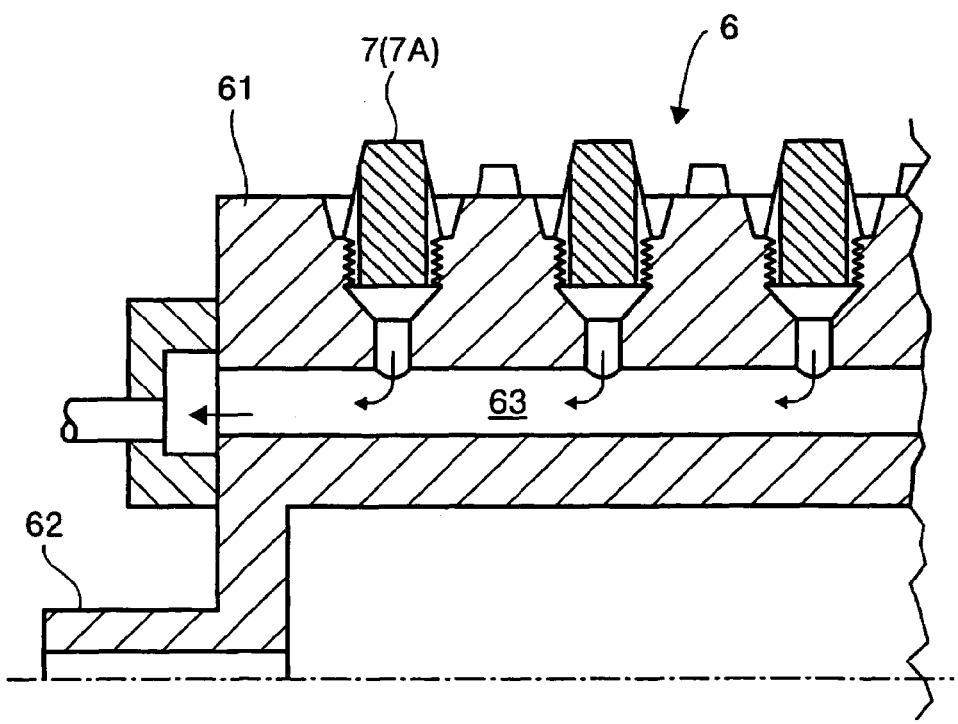
FIG. 13 is a partial, longitudinal section view illustrating structure of a vacuum-forming roll used in an embodiment of apparatus for producing a plastic sheet having a number of recessed and protruded parts according to the invention.
Figure 15:
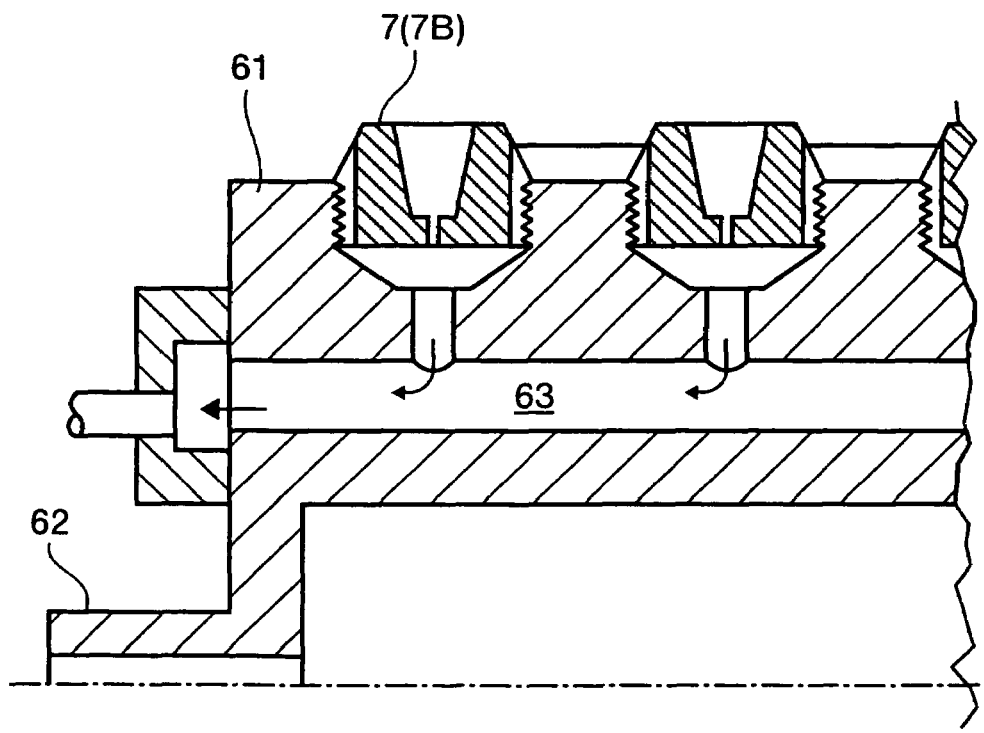
FIG. 15 is a partial, longitudinal section view, corresponding to FIG. 13, illustrating structure of a vacuum-forming roll used in another embodiment of apparatus for producing a plastic sheet having a number of recessed and protruded parts according to the invention.

The apparatus according to the invention for producing the plastic sheet having a number of recessed and protruded parts has no principal difference from the conventional apparatus for producing plastic bubble boards. As shown in FIG. 13 and FIG. 15, the apparatus comprises a vacuum forming roll cylinder (61) made of metal, which is supported rotatably around the axis (62) thereof, in which vacuum suction channels (63) are provided; and forming plugs (7) having vacuum suction passages, which are fixed on the surface of the cylinder so that the tops of the plugs may be higher than the surface of the cylinder. The vacuum system is so regulated that the plugs are connected to the vacuum source (not shown) only when they are in a certain rotational position. The apparatus of the invention may be constructed by remodeling of the existing apparatus.

Figure 14:
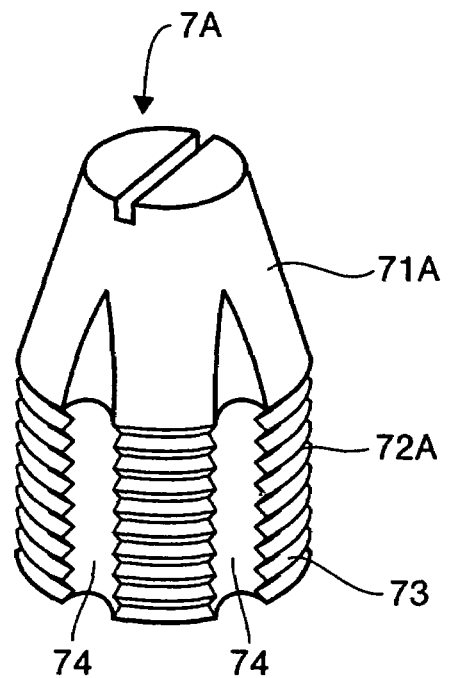
FIG. 14 is a perspective view showing the shape of a forming-plug used in the vacuum-forming roll of FIG. 13.

The forming plug (7) to be fixed on the forming roll cylinder (6) is roughly classified into two types. FIG. 14 shows one (7A) of the two types. The plug of this type comprises: a head (71A), which is a positive projection of the shape corresponding to the protruded, truncated cone-shaped part to give the shape to the extruded flat plastic sheet, and a base (72A) with threads (73) for fixing the plug to the forming roll cylinder. The plug (7A) forms the negative part together with the recessed part provided on the surface of the forming roll cylinder, which gives the recessed, ring-shaped part to the flat plastic sheet. The forming plug (7A) has vacuum suction grooves (74) around the base. Fixation of the plugs to the forming roll cylinder (61) may be done by screw clamping using the threads as illustrated, and this way is superior in view of sure fixing and possibility of replacement of the plugs. However, in case where necessity of replacing the forming plugs is low, it will be enough to fix the plugs by striking them to fit in the forming roll cylinder.

Various embodiments are possible in the forming plug (7A). Of course the projection may not necessary be truncated cone shape with round section but may be of a pyramid shape with hexagonal or octagonal section. It may be possible that the top of the projection is round and the base is pyramidal. Such a shape can be compared to the head of a pencil on the way of sharpening. Anyway, the plug having a pyramidal part can be turned with a wrench. In case of using the plugs of round cone without any hold for wrench, it is recommended to provide a plus or minus groove at the top of the plug so that the plug may be turned with a driver. Preparation of the forming plugs can be carried out by machining, and this is an easy way of manufacturing. However, because of plurality of the plugs necessary for one vacuum forming roll, it is recommended to employ a more efficient way of manufacturing such as formation of the heads by closed die forging followed by thread rolling.

Figure 16:
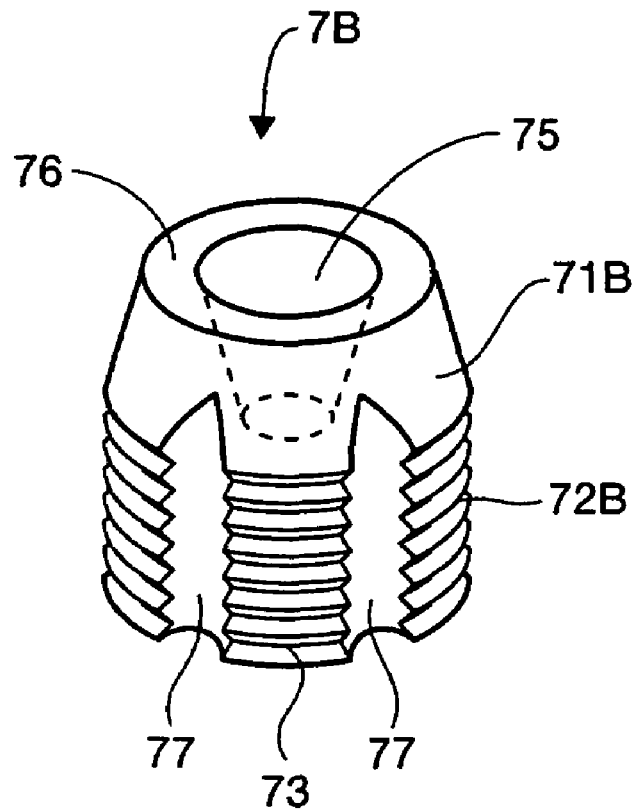
FIG. 16 is a perspective view showing the shape of a forming-plug used in the vacuum-forming roll of FIG. 15.
Figure 17:
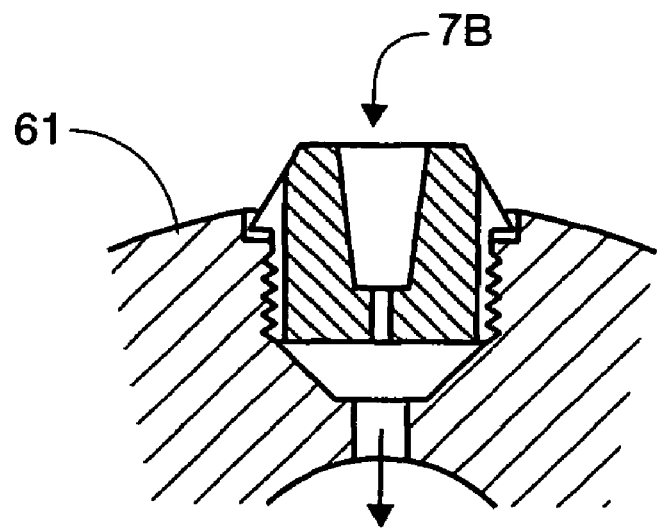
FIG. 17 is a section view of the forming-plug shown in FIG. 16 to explain a preferred fixation of the plug.

Another embodiment (7B) of the forming plug is shown in FIG. 16 and FIG. 17. The plug of this type comprises: a head (71B), which has a negative recess (75) of the shape corresponding to the protruding part and a positive projection (76) of the shape corresponding to the recessed part surrounding the negative recess to give the ring-shaped recess to the extruded flat plastic sheet, and a base (72B) with threads for fixing the plug on the forming roll cylinder (6). The forming plug (7B) also has a vacuum suction hole at the bottom of the negative recess and the vacuum suction grooves (77) around the positive projection of the base.

The above description on the configuration and manufacturing concerning the first embodiment (7A) of the forming plug (7) is applicable to the second embodiment (7B) as it is.

However, in case where the second embodiment is chosen, if the diameter of the vacuum forming roll cylinder is relatively small and the forming plug is large, simple fitting by screw clamping causes, due to the curvature of the forming roll cylinder, formation of gaps between the forming plugs and the forming roll cylinder at some parts, and care must be taken for this. At such a part the heat possessed by the plastic sheet in the molten state will not be sufficiently transmitted to the cylinder. Then, accumulation of heat will occur in the forming plugs and results in temperature increase of the plugs. It is needless to say that local temperature increase in the apparatus is unfavorable to plastic processing.

Such problem of heat accumulation may be solved by entire contact of the forming plugs to the forming roll cylinder. It is advisable, as shown in FIG. 17, to cut down the surface of the cylinder on which the forming plug is fixed.

The plastic sheet having a number of recessed and protruded parts according to the present invention is relatively soft and has, in addition to good cushioning property, excellent ability in preventing slip. Thus, the plastic sheet of the invention is particularly suitable as a simple protecting sheet. The two-layered double wall sheet made by combining this plastic sheet and a back sheet or a liner sheet has extremely higher bending rigidity and plane compressive strength when compared with conventional plastic bubble boards, and therefore, it is useful as the material for various panels. Relatively thin products of the two-layered double wall sheet has, though the bending rigidity and the plane compressive strength are not high, better cushioning property, and is useful as the material for various cushion packaging.

The three-layered double wall sheet made by combining the plastic sheet having a number of recessed and protruded parts with both the back sheet and the liner sheet exhibits remarkably high bending rigidity and plane compressive strength, and the warp as manufactured is much better than that of the conventional products. This is suitable as the material for a packaging container to contain heavy things.

The double wall sheet according to the invention, of course the three-layered product, even the two-layered product, is characterized by its high thermal insulating property. This seems to be caused by the fact that movement of air confined in the bubbles is more strongly prevented in the present product when compared with the conventional plastic bubble boards due to the structural difference. It is known that, in the bubble boards, as the size of the bubble reaches a certain extent, convection of the air occurs in the bubbles and results in decrease of the thermal insulating effect. However, in the double wall sheet of the invention, the space in the protruded, cone-shaped parts and the space in the recessed, ring-shaped parts are divided by the plastic sheet, the convection of air in question can occur only in the separate spaces. Thus, the heat transfer by convection is reduced.

EXAMPLES

Example 1

Plastic Sheet Having a Number of Recessed and Protruded Parts

A polyethylene of density 0.92 g/cm$^3$ and MI 2 g/10 min. was used as the material and a plastic sheet having a number of recessed and the protruded parts was produced with the following specification. The product was suitable for the protecting sheet.

Thickness of the plane part: 0.5 mm

Height of the protruded parts H: 10 mm

Diameter of the truncated cone: 7 mm

Depth of the recessed part D: 10 mm

Diameter of the recessed part: 32 mm

Pitch: 55 mm

Distribution: staggered

Example 2

Two-Layered Double Wall Sheet

On the plastic sheet having a number of recessed and protruded parts produced in Example 1, a sheet of the same material of the thickness 0.3 mm was laminated as the back sheet to produce a two-layered double wall sheet of the invention. The double two-layered wall sheet had the following properties:

Bending rigidity: 35 Kg (measured by the bending test according to JIS Z7204)

Plane compressive strength: 25 Kgf/cm$^2$

Example 3

Three-Layered Double Wall Sheet

On the plastic sheet having a number of recessed and protruded parts produced in Example 1, two sheets of the same material of the thickness 0.3 mm were laminated as the back sheet and the liner sheet to produce a three-layered double wall sheet of the invention. The three-layered double wall sheet had the following properties:

Bending rigidity: 55 Kg (measured as above)

Plane compressive strength: 27 Kgf/cm$^2$.

The invention claimed is:

1. A method of producing the plastic sheet having a number of recessed and protruded parts produced by thermal processing to form a number of uneven parts consisting of a protruding, truncated cone-shaped part and a recessed, ring-shaped part surrounded and continuing from the protruding part on a plane of a plastic sheet, comprising the steps of:

feeding a plastic sheet in the molten state extruded from a T-die to a vacuum forming roll, which rotates around an axis at a center of the vacuum forming roll and has plural projections and ring-shaped recesses each surrounding the projections and vacuum suction passages therein;

forming plural protruded, truncated cone-shaped parts and recessed, ring-shaped parts surrounding and continuing from the protruding parts to have the parts evenly distributed on the plane of the plastic sheet, and peeling the formed plastic sheet from the vacuum forming roll.

2. A method of producing the two-layered double wall sheet produced by adhering a flat liner sheet to tops of the truncated cones of the plastic sheet having a number of recessed and protruded parts produced by thermal processing to form a number of uneven parts consisting of a protruding, truncated cone-shaped part and a recessed, ring-shaped part surrounded and continuing from the protruding part on a plane of a plastic sheet, comprising the steps of:

feeding a first plastic sheet in the molten state extruded from a T-die to a vacuum forming roll, which rotates around an axis at a center of the vacuum forming roll and has plural projections and ring-shaped recesses each surrounding the projections and vacuum suction passages therein;

forming plural protruded, truncated cone-shaped parts and recessed, ring-shaped parts surrounding and continuing from the protruding parts to have the parts evenly distributed on the plane of the first plastic sheet;

peeling the formed first plastic sheet from the vacuum forming roll; and feeding a second plastic sheet in the molten state extruded from another T-die to the tops of the plural truncated cone-shaped parts or to a flat surface of the sheet so as to adhere by fusion to give the liner sheet, or to bottoms of the recessed, ring-shaped parts so as to have the second sheet adhered by fusion to give the back sheet to the first plastic sheet.

3. A method of producing the two-layered double wall sheet produced by adhering a flat back sheet to tops of the truncated cones of the plastic sheet having a number of recessed and protruded parts produced by thermal processing to form a number of uneven parts consisting of a protruding, truncated cone-shaped part and a recessed, ring-shaped part surrounded and continuing from the protruding part on a plane of a plastic sheet, comprising the steps of:

feeding a first plastic sheet in the molten state extruded from a T-die to a vacuum forming roll, which rotates around an axis at a center of the vacuum forming roll and has plural projections and ring-shaped recesses each surrounding the projections and vacuum suction passages therein;

forming plural protruded, truncated cone-shaped parts and recessed, ring-shaped parts surrounding and continuing from the protruding parts to have the parts evenly distributed on the plane of the first plastic sheet;

peeling the formed first plastic sheet from the vacuum forming roll; and feeding a second plastic sheet in the molten state extruded from another T-die to bottoms of the plural recessed, ring-shaped parts of the first plastic sheet pealed from the vacuum forming roll so as to adhere by fusion to give the back sheet, or to the tops of the plural truncated cone-shaped parts or to a flat surface of the first plastic sheet so as to have the second plastic sheet adhered by fusion to give the liner sheet.

4. A method of producing the three-layered double wall sheet produced by adhering a flat liner sheet to tops of the truncated cones and a flat back sheet to the bottom of the recessed, ring-shaped part of the plastic sheet having a number of recessed and protruded parts produced by thermal processing to form a number of uneven parts consisting of a protruding, truncated cone-shaped part and a recessed, ring-shaped part surrounded and continuing from the protruding part on a plane of a plastic sheet, comprising the steps of:

feeding a first plastic sheet in the molten state extruded from a first T-die to a vacuum forming roll, which rotates around an axis at a center of the vacuum forming roll and has plural projections and ring-shaped recesses each surrounding the projections and vacuum suction passages therein;

forming plural protruded, truncated cone-shaped parts and recessed, ring-shaped parts surrounding and continuing from the protruding parts to have the parts evenly distributed on the plane of the first plastic sheet, peeling the formed first plastic sheet from the vacuum forming roll; and feeding a second plastic sheet in the molten state extruded from a second T-die to the tops of the plural truncated cone-shaped parts or to a flat surface of the first plastic sheet so as to adhere by fusion to give the liner sheet, or to bottoms of the recessed, ring-shaped parts so as to have the second sheet adhered by fusion to give the back sheet to the first plastic sheet; and feeding a third plastic sheet in the molten state extruded from a third T-die to the bottoms of the plural recessed, ring-shaped parts of the third plastic sheet pealed from the vacuum forming roll so as to adhere by fusion to give the back sheet, or to the tops of the plural truncated cone-shaped parts or to the flat surface of the first plastic sheet so as to have the third plastic sheet adhered by fusion to give the liner sheet.

5. An apparatus for carrying out the method of producing the plastic sheet having a number of recessed and protruded parts defined in claim 1, comprising:

a vacuum forming roll cylinder made of metal, which is supported rotatably around the axis thereof, and inside of which is connected to a vacuum source;

forming plugs having vacuum suction passages and fixed on the surface of the forming roll cylinder so that the tops of the plugs may be higher than the surface of the cylinder; and a vacuum system allowing connection of the plugs to the vacuum source only when the plugs are in a certain rotational position.

6. The apparatus according to claim 5, wherein each forming plug includes a head, which is a positive projection of the shape corresponding to the protruded, truncated cone-shaped part, and a base with threads for fixing the plug to the forming roll cylinder, each plug forming a negative part together with the recessed part provided on the surface of the forming roll cylinder to give the ring-shaped recess, and having vacuum suction grooves around the base.

7. The apparatus according to claim 5, wherein each forming plug includes a head, which has a negative recess of the shape corresponding to the protruding part and a positive projection of the shape corresponding to the recessed part surrounding the negative recess to give the ring-shaped recess to the flat plastic sheet, and a base with threads for fixing the plug on the forming roll cylinder, each plug having a vacuum suction hole at the bottom of the negative recess and the vacuum suction grooves (77) around the positive projection of the base.

* * * * *